US006968379B2

(12) United States Patent
Nielsen

(10) Patent No.: US 6,968,379 B2
(45) Date of Patent: *Nov. 22, 2005

(54) LATENCY-REDUCING BANDWIDTH-PRIORITIZATION FOR NETWORK SERVERS AND CLIENTS

(75) Inventor: Jakob Nielsen, Atherton, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,962

(22) Filed: May 30, 1997

(65) Prior Publication Data

US 2001/0003830 A1 Jun. 14, 2001

(51) Int. Cl.[7] .......................... G06F 15/173; G06F 9/00
(52) U.S. Cl. ...................................... 709/226; 718/104
(58) Field of Search ................................ 709/226, 203, 709/223, 224, 229; 718/101–105; 725/95, 96; 395/200.56, 864, 200.63; 370/468, 477, 351

(56) References Cited

U.S. PATENT DOCUMENTS

| 4,481,583 A | * | 11/1984 | Mueller ...................... 710/244 |
| 4,642,758 A | | 2/1987 | Teng |
| 5,115,430 A | * | 5/1992 | Hahne et al. ................ 370/440 |
| 5,132,966 A | * | 7/1992 | Hayano et al. ................ 370/79 |
| 5,153,877 A | | 10/1992 | Esaki et al. |
| 5,282,202 A | * | 1/1994 | Bernstein et al. ........... 370/468 |
| 5,315,586 A | * | 5/1994 | Charvillat .................... 370/232 |
| 5,381,413 A | * | 1/1995 | Tobagi et al. .............. 370/85.6 |
| 5,414,697 A | | 5/1995 | Osaki |
| 5,428,778 A | | 6/1995 | Brookes |
| 5,428,789 A | * | 6/1995 | Waldron, III ................ 709/103 |
| 5,526,350 A | * | 6/1996 | Gittins et al. ............... 370/58.1 |
| 5,548,506 A | * | 8/1996 | Srinivasan ..................... 705/8 |
| 5,581,703 A | * | 12/1996 | Baugher et al. ............. 709/225 |
| 5,596,576 A | * | 1/1997 | Milito ......................... 370/450 |
| 5,673,253 A | * | 9/1997 | Shaffer ........................ 370/229 |

(Continued)

FOREIGN PATENT DOCUMENTS

| EP | 384339 A2 | * | 8/1990 | ............. G06F/9/46 |
| EP | 0 632 671 A2 | | 1/1995 | |
| EP | 0 693 840 A1 | | 1/1996 | |
| GB | 2 301 260 A | | 11/1996 | |
| WO | WO 95/08793 | | 3/1995 | |

OTHER PUBLICATIONS

Lee et al., "A Bandwidth Reallocation Scheme for Ethernet–based Real–time Communication," Oct. 27, 1995, Second International Workshop on Real–Time Computing Systems and Applications, pp. 28–33.*

(Continued)

*Primary Examiner*—Bradley Edelman
(74) *Attorney, Agent, or Firm*—Finnegan, Henderson, Farabow, Garrett & Dunner, L.L.P.

(57) ABSTRACT

Communications bandwidth available to network servers and computers running client processes is allocated among connections available to those devices based on sets of priorities. Those priorities include type of information being retrieved, how fast user connections can receive information, which part of a document is being transmitted, user identity, stored indicia indicating importance of the document and the state of application processes running on said computer. Bandwidth is reallocated on an event driven basis upon arrival of a new request for retrieval, finishing sending information in response to a retrieval request, cancellation of a retrieval request, detection of the inability of a user connection to use all of the bandwidth allocated to it, a change of priority and timeout of a timer.

11 Claims, 14 Drawing Sheets

U.S. PATENT DOCUMENTS

| | | | | | |
|---|---|---|---|---|---|
| 5,724,659 | A | * | 3/1998 | Daniel et al. | 455/452.2 |
| 5,731,805 | A | * | 3/1998 | Tognazzini et al. | 345/156 |
| 5,734,909 | A | * | 3/1998 | Bennett | 710/200 |
| 5,742,594 | A | * | 4/1998 | Natarajan | 370/336 |
| 5,802,301 | A | * | 9/1998 | Dan et al. | 709/223 |
| 5,826,031 | A | * | 10/1998 | Nielsen | 395/200.63 |
| 5,838,968 | A | * | 11/1998 | Culbert | 709/104 |
| 5,870,629 | A | * | 2/1999 | Borden et al. | 395/864 |
| 5,903,735 | A | * | 5/1999 | Kidder et al. | 370/252 |
| 5,926,481 | A | * | 7/1999 | Wang et al. | 370/465 |
| 5,943,046 | A | * | 8/1999 | Cave et al. | 345/327 |
| 5,983,261 | A | * | 11/1999 | Riddle | 709/204 |
| 5,987,518 | A | * | 11/1999 | Gotwald | 709/230 |
| 6,011,804 | A | * | 1/2000 | Bertin et al. | 370/468 |
| 6,018,659 | A | * | 1/2000 | Ayyagari et al. | 455/431 |
| 6,023,456 | A | * | 2/2000 | Chapman et al. | 370/252 |
| 6,038,214 | A | * | 3/2000 | Shionozaki | 370/230 |
| 6,047,322 | A | * | 4/2000 | Vaid et al. | 709/224 |
| 6,055,577 | A | * | 4/2000 | Lee et al. | 709/233 |
| 6,097,882 | A | * | 8/2000 | Mogul | 709/201 |
| 6,125,396 | A | * | 9/2000 | Lowe | 709/234 |
| 6,141,322 | A | * | 10/2000 | Poretsky | 370/231 |
| 6,195,362 | B1 | * | 2/2001 | Darcie et al. | 370/431 |
| 6,324,184 | B1 | * | 11/2001 | Hou et al. | 370/468 |
| 6,396,816 | B1 | * | 5/2002 | Astle et al. | 370/264 |
| 6,578,077 | B1 | * | 6/2003 | Rakoshitz et al. | 709/224 |

OTHER PUBLICATIONS

Bettati et al., "Dynamic Resource Migration for Multiparty Real–Time Communication," May 1996, The Tenet Group, University California Berkeley, printed from http://faculty.cs.tamu.edu/bettati/Papers/icdcs96.drm/html/drm.html, pp. 1–15.*

Shacham, "Preemption–based Admission Control in Multimedia Multiparty Communications," Apr. 6, 1995, Fourteenth Annual Joint Conference of the IEEE Computer and Communications Societies, Bringing Information to People, vol. 2, pp. 827–834.*

Vaid et al., Provisional U.S. Appl. No. 60/047,752, filed May 27, 1997.*

Pappalardo, "ISP Tool Might Make Web Browsing More Painful," Jun. 2, 1997, Network World, vol. 14, Iss. 22, p. 38.*

Herrin et al., "The Benefits of Service Rebalancing," Apr. 1992, Proceedings, Third Workshop on Workstation Operating Systems, 1992, pp. 104–110.*

Himonas et al., "A Multiple Access Control Protocol for an Interactive Multimedia Network," Nov. 22, 1996, Global Telecommunications Conference, 1996, vol. 1, pp. 262–266.*

Patent Abstracts of Japan, vol. 12, No. 185 (p. 170), May 31, 1988, JP Publication No. 62293310.

H. Shrikumar et al."Thinternet: Life at the End of a Tether", Computer Networks and ISDN Systems, NL, North Holland Publishing, Amsterdam, vol. 27, No. 3, p. 375–385, XP004037970, ISSN: 0169–7752.

Ing –Ray Chen et al., "Threshold–Based Admission Control Policies for Multimedia Servers", Computer Journal, GB, Oxford University Press, Surrey, vol. 39, No. 9, p. 757–766, XP000720396, ISSN: 0010–4620.

Jon C.R, Bennett et al., "WF2Q: Worst–Case Fair Weighted Fair Queueing", Proceedings of Infocom, US, Los Alamitos, IEEE Comp. Soc. Press, vol. Conf. 15, p. 120–128, XP000622302, ISBN: 0–8186–7293–5.

D. N. Kanellopoulos et al., "C–MACSE: A New Connection Establishment Protocol for Multimedia Communications Residing at the OSI Application Layer Adopting a Comprehensive QoS Approach", NL, Amsterdam, IOS, p. 141–150, XP 000754559, ISBN: 90–5199–290–4.

* cited by examiner

| FILE TYPE (400) | PRIORITY (410) | |
|---|---|---|
| 420 → HTML | 4 | ← 430 |
| 440 → STYLE SHEET | 3 | ← 450 |
| 460 → (RESERVED) | 2 | ← 470 |
| 480 → GIF | 1 | ← 485 |
| 490 → JPG | 1 | ← 495 |
| - - - | - | |
| - - - | - | |

FIG. 4

ALLOCATED UTILIZATION TABLE (AUT) 500

| FILE | PRIORITY | ALLOCATED BANDWIDTH | UTILIZED BANDWIDTH | RECALC |
|---|---|---|---|---|
| DOC1.HTML | 4 | 28.8 Kbps | 14.4 Kbps | FALSE |
| DOC2.HTML | 4 | 128 Kbps | 64 Kbps | FALSE |
| DOC3.HTML | 4 | 28.8 Kbps | 28.8 Kbps | TRUE |
| IMAGE.GIF | 1 | 9.6 Kbps | 9.6 Kbps | TRUE |
| — | — | — | — | — |

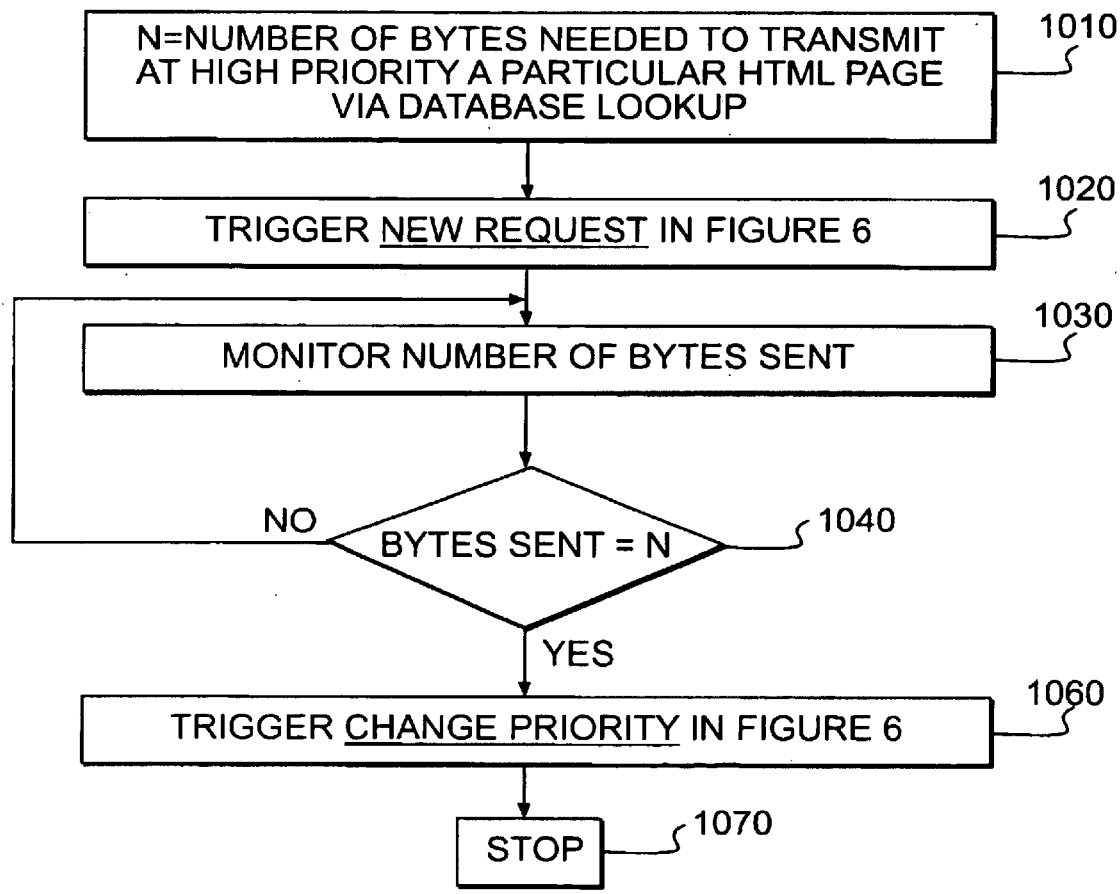

LATENCY-REDUCING BANDWIDTH-PRIORITIZATION FOR NETWORK SERVERS AND CLIENTS

BACKGROUND OF THE INVENTION

1. Field of the Invention

The invention relates to communication systems and more particularly to client server communication systems in which communications resources provided to a retrieval request or to a connection to a particular server can be adjusted to reflect priorities.

2. Description of Related Art

Accessing the content of servers on a network, such as the World Wide Web (WWW), is often agonizingly slow. Response time may be so slow that users cancel their request for a page and select another page, perhaps that of a competitor. Getting enough text to the user quickly so that he may begin reading is important to prevent him from canceling his request. Reducing the initial latency from request to delivery of readable text will result in a more satisfying browsing experience for the user.

Data compression is known. Various data compression algorithms may be employed depending upon the type of data (text, image, video, audio) to be transmitted. Fortunately, many if not most network servers employ compression. Unfortunately, the latency problems associated with retrieving server pages continue to grow worse with increasing network usage.

SUMMARY OF THE INVENTION

The present system provides apparatus, systems, methods and computer program products which will allow improved average response time in client server technology. This is accomplished by prioritizing the content of network pages and allocating server or client bandwidth accordingly. The prioritization scheme is driven by the need to render a viewable page as quickly as possible so that the user may begin reading it. In the prior art, all files that make up the final appearance of a WWW page (text, style sheets, graphics, audio etc.) are sent with equal priority. By using a prioritization scheme, it is possible to dramatically reduce the latency perceived by the user which, in turn, increases the perceived usability of the web site.

Two mechanisms facilitate this. First, the order in which information is displayed to the user "hides" some of the latency thus creating the perception of faster response time. Second, by monitoring individual connections it is possible to determine which connections are not currently utilizing the bandwidth initially made available to them. When this occurs, the unused bandwidth is allocated to all other existing connections which might be able to use it.

The same concepts can be applied to the client-side (the user) in one form by allowing the client to indicate to the server the speed with which the client will accept information. In another form, a client that has multiple browsers connected to respective multiple network servers can prioritize each connection to insure, for example, that the current browser window's connection is allocated more bandwidth than a minimized browser window's connection. This is not possible using the prior art since all connections are given the same priority.

The invention is directed to computer apparatus, such as that found at a server, for allocating communications bandwidth to a plurality of user connections. The apparatus includes a processor configured to allocate communications bandwidth to said user connections based on at least one set of priorities.

The invention is also directed to computer apparatus, such as that running a client process, for allocating communications bandwidth to a plurality of server connections based on at least one set of priorities.

The invention is also directed to a communications system operating on a network and having at least one server and at least one computer running a client process in which said at least one server or said at least one computer allocates bandwidth to a plurality of network connections based on at least one set of priorities.

The invention is also directed to methods for operating servers and clients to allocate bandwidth to connections based on at least one set of priorities.

The invention also relates to computer program products useful for carrying out the methods and for implementing the apparatus described.

The foregoing and other features, aspects and advantages of the present invention will become more apparent from the following detailed description of the present invention when taken in conjunction with the accompanying drawings.

BRIEF DESCRIPTION OF THE DRAWINGS

The object, features and advantages of the system of the present invention will be apparent from the following descriptions, in which:

FIG. 4 is a database schema organized as an exemplary way for storing file-type priorities.

FIG. 5 is a database schema of an exemplary way for storing current connection information, namely in an Allocated Utilization Table (AUT).

FIG. 10A is a database schema organized as an exemplary way for storing a value representing the respective amount of data specific files need to have transmitted at high priority.

FIG. 10B is a flowchart of a process for changing the priority of a connection after the variable amount of data indicated in FIG. 10A has been transmitted.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENTS

Figure 1A:
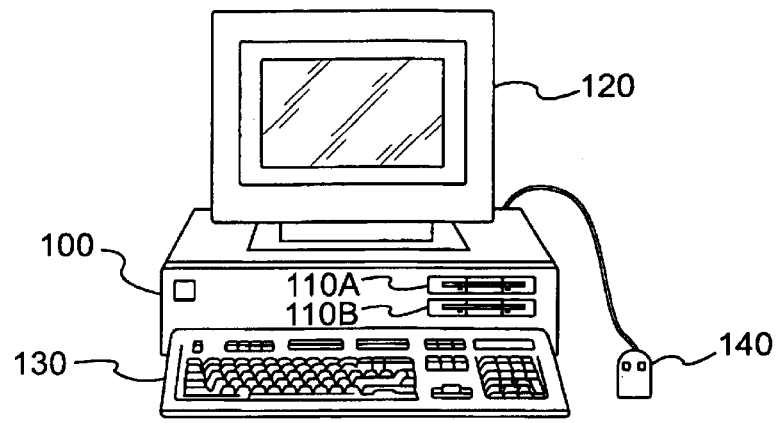
FIG. 1A illustrates a computer of a type suitable for carrying out the invention as either a client or a server.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has a display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
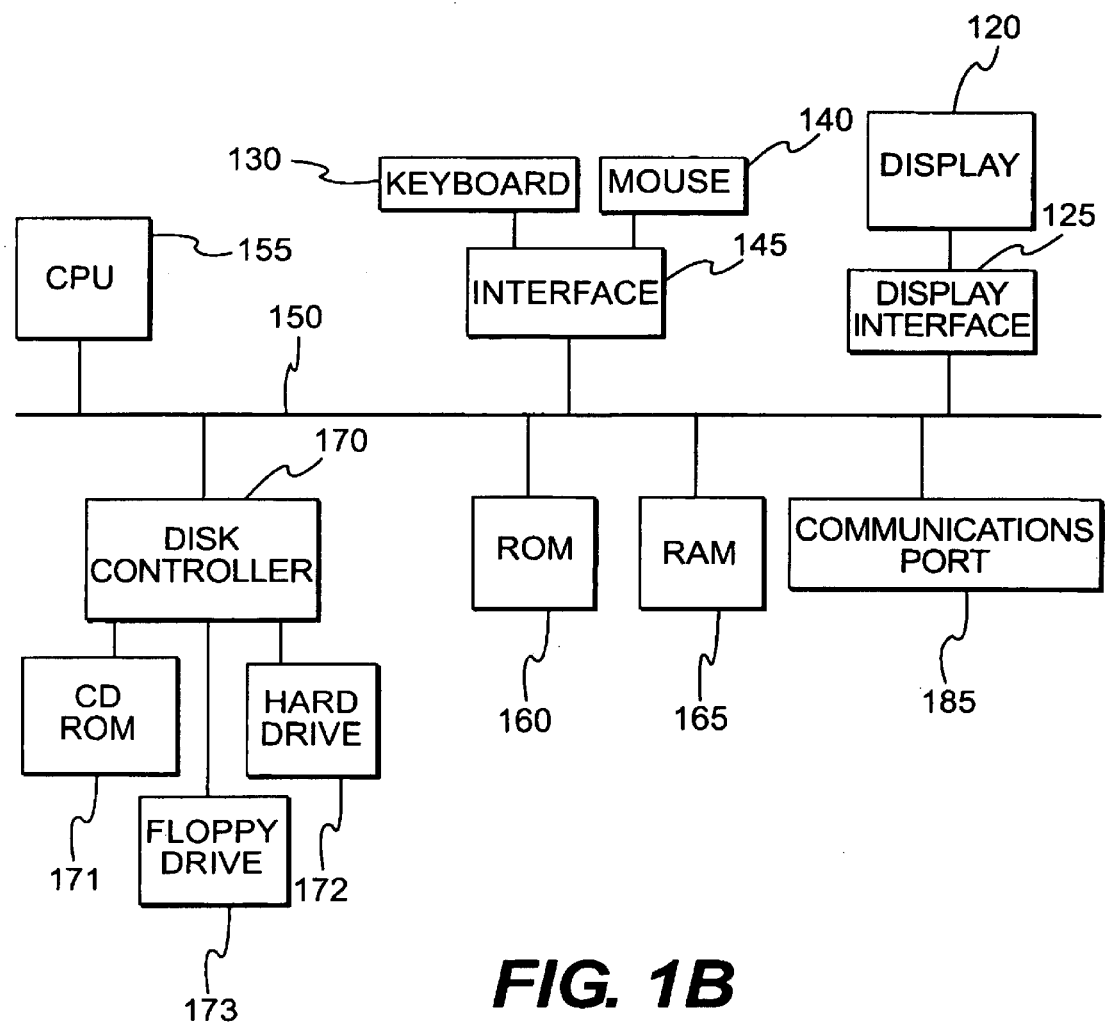
FIG. 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices such as a network can occur over communications port 185.

Figure 1C:
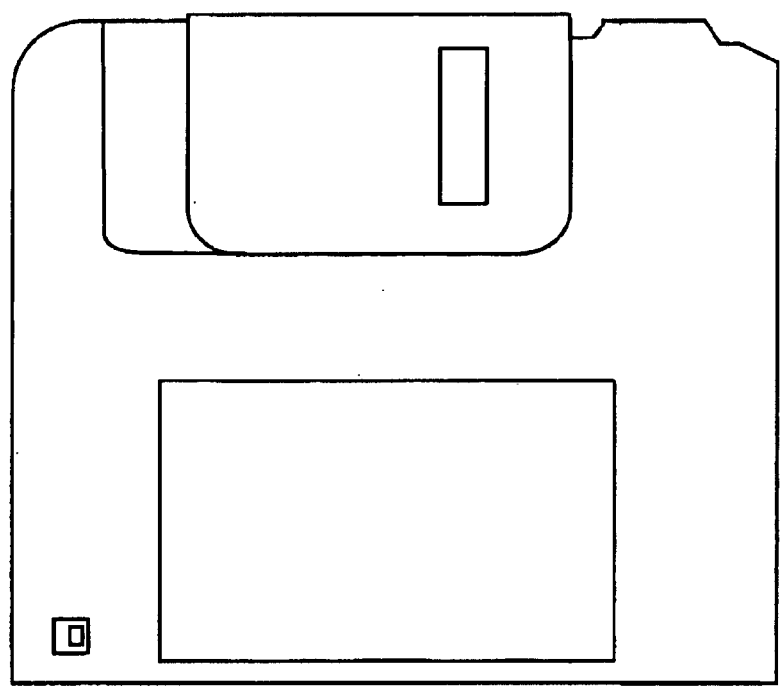
FIG. 1C illustrates an exemplary memory medium containing on or more programs usable with the computer of FIG. 1A.

FIG. 1C illustrates an exemplary memory medium which can be used with drives such as 173 in FIG. 1B or 110A in FIG. 1A. Typically, memory media such as a floppy disk, CD ROM, or Digital Video Disk will contain the program information for controlling the computer to enable the computer to performs its functions in accordance with the invention.

Figure 2A:
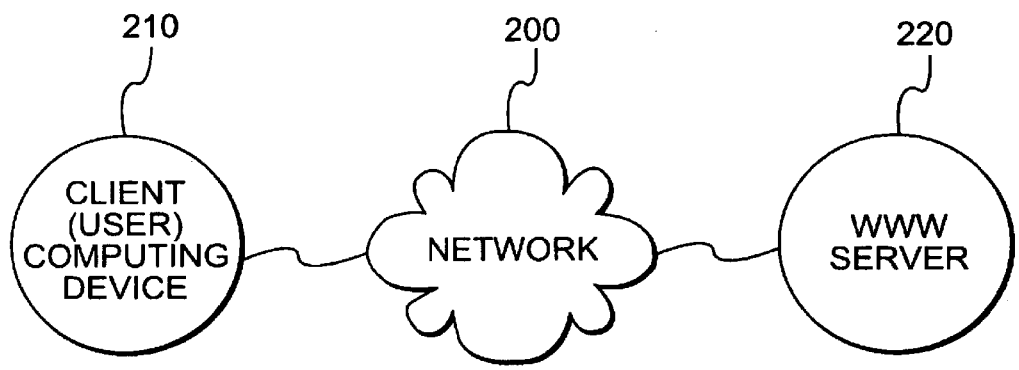
FIG. 2A is an illustration of one exemplary form of implementing the invention using a network such as an intranet.

FIG. 2A is an illustration of one exemplary form of implementing the invention using a network such as an intranet. The network 200 is typically an internal organizational network that connects the client computing device 21D and at least one WWW server 22D.

Figure 2B:
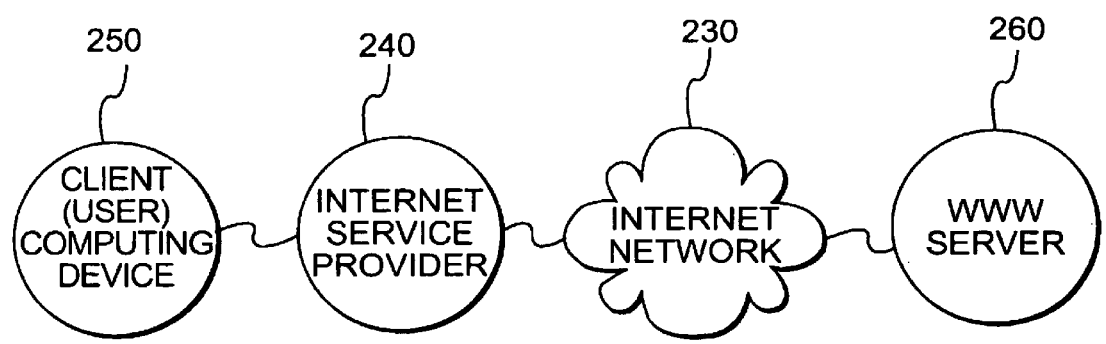
FIG. 2B is an illustration of another exemplary form of implementing the invention using a typical internet arrangement.

FIG. 2B is an illustration of another exemplary form of implementing the invention using a typical Internet arrangement. The client computing device 250 connects via one network with the client's Internet Service Provider (ISP) 240. The ISP 240 then connects via the Internet 230 to a WWW server 260 requested by the user.

Figure 3:
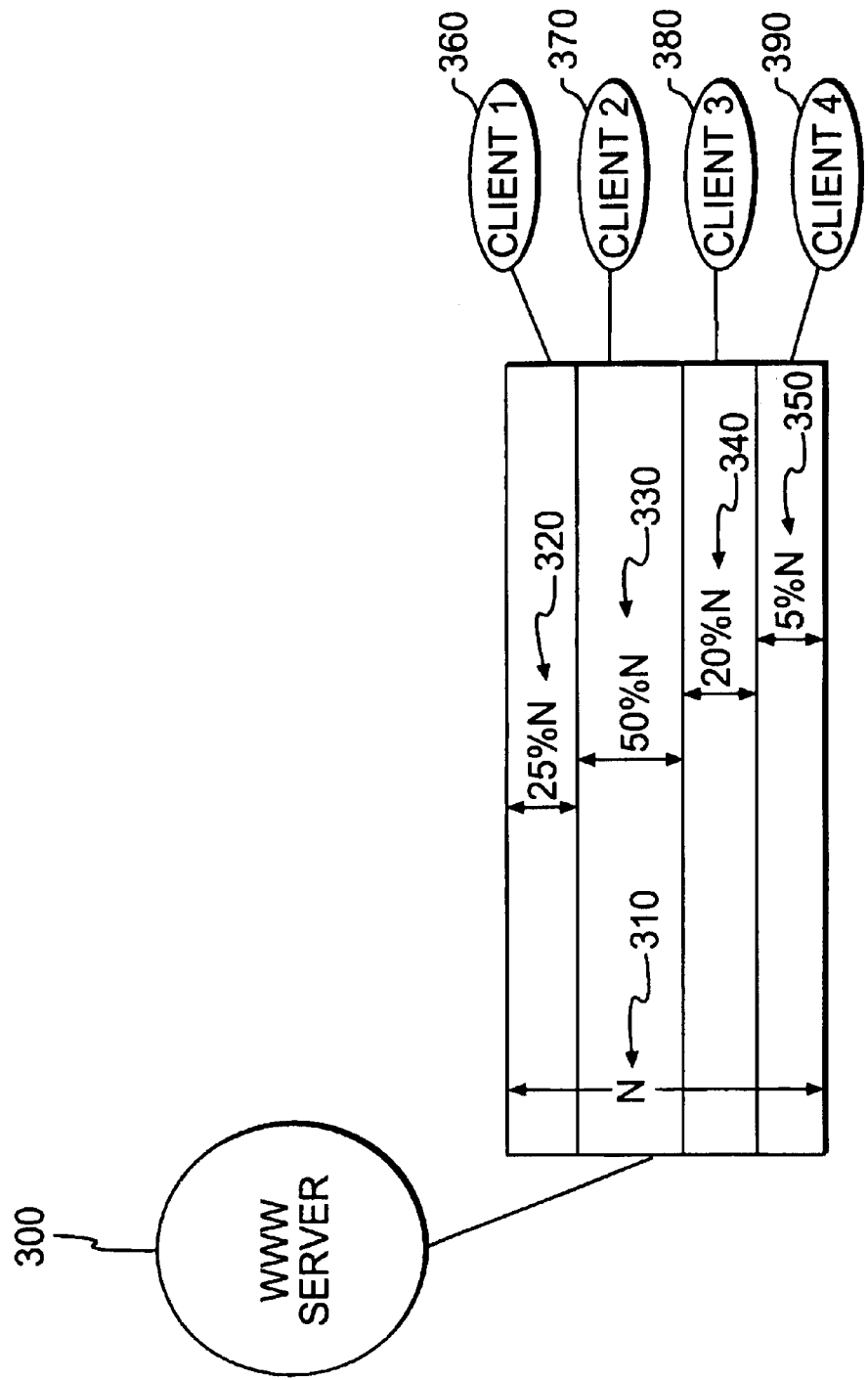
FIG. 3 is an illustration of bandwidth allocation from a network server to several clients.

FIG. 3 is an illustration of bandwidth allocation from a network server to several clients. The network server 300 has a predetermined amount of bandwidth N 310 which it must divide 320, 330, 340 and 350 between multiple clients 360, 370, 380, and 390. Note that the bandwidth allocation each client receives varies. This variance reflects the bandwidth allocation of the prioritized client connections as described in FIGS. 47, hereinafter.

Figure 4:
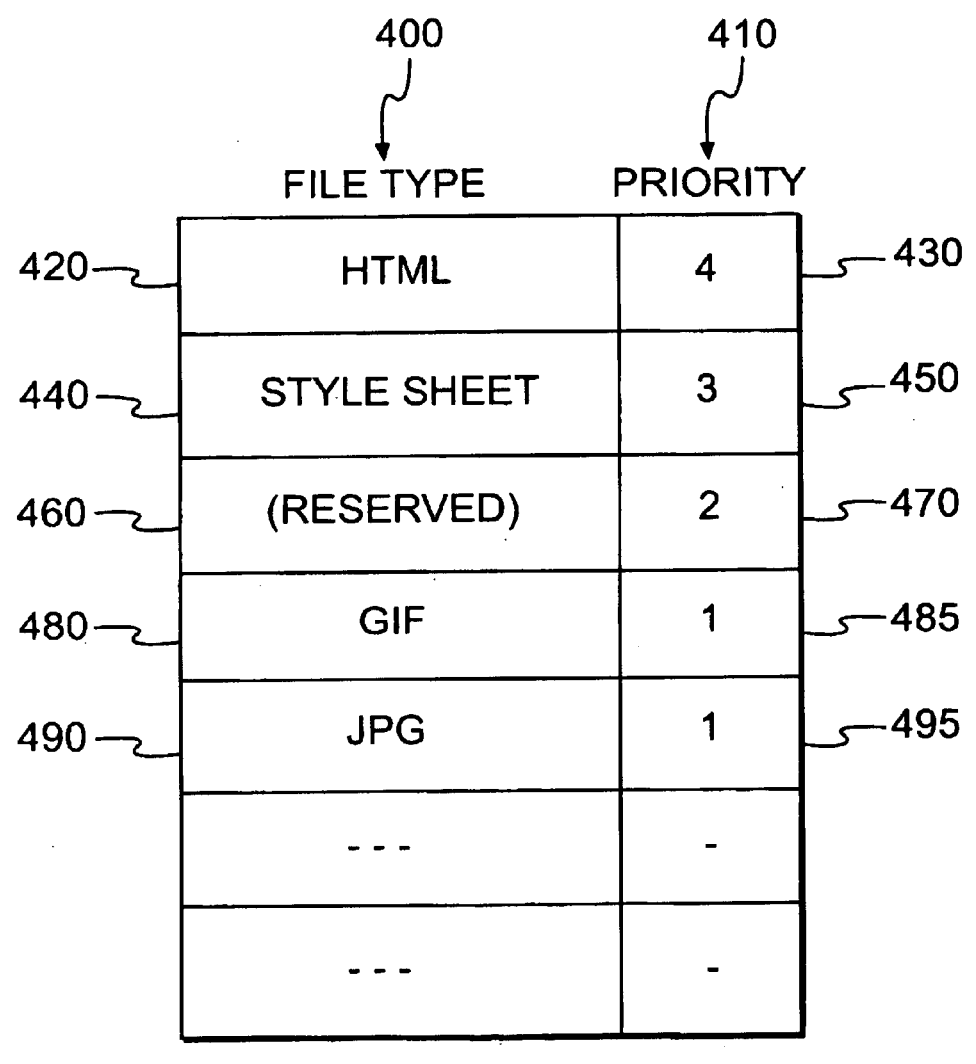

FIG. 4 is a database schema organized as an exemplary way for storing file-type priorities. The table has two columns: File Type 400 and Priority 410. An HTML file 420 will have a priority of 4 (430). A style sheet 440 will have a priority of 3 (450). Priority 2 470 is reserved for future use. GIF 480 and JPG files 490 both have priorities of 1 (485 and 495).

FIG. 5 is a database schema organized as an exemplary way for storing connection information about clients actively involved in retrievals. The Allocation Utilization Table (AUT) 500 shown is a data structure used to track the status of each active current connection. For each such active current connection the file name 510, priority 520 (determined from FIG. 4), allocated bandwidth 530, utilized bandwidth 540, and a recalculation Boolean variable 550 are stored in the AUT. The AUT is used to provide the data for the bandwidth reallocation algorithm of FIG. 7. In rows 560 and 565 it should be noted that the allocated bandwidth exceeds the utilized bandwidth. When this difference exceeds a threshold, the recalculation variables are automatically set to FALSE to prevent re-allocation of more bandwidth than the connection can utilize.

Figure 6:
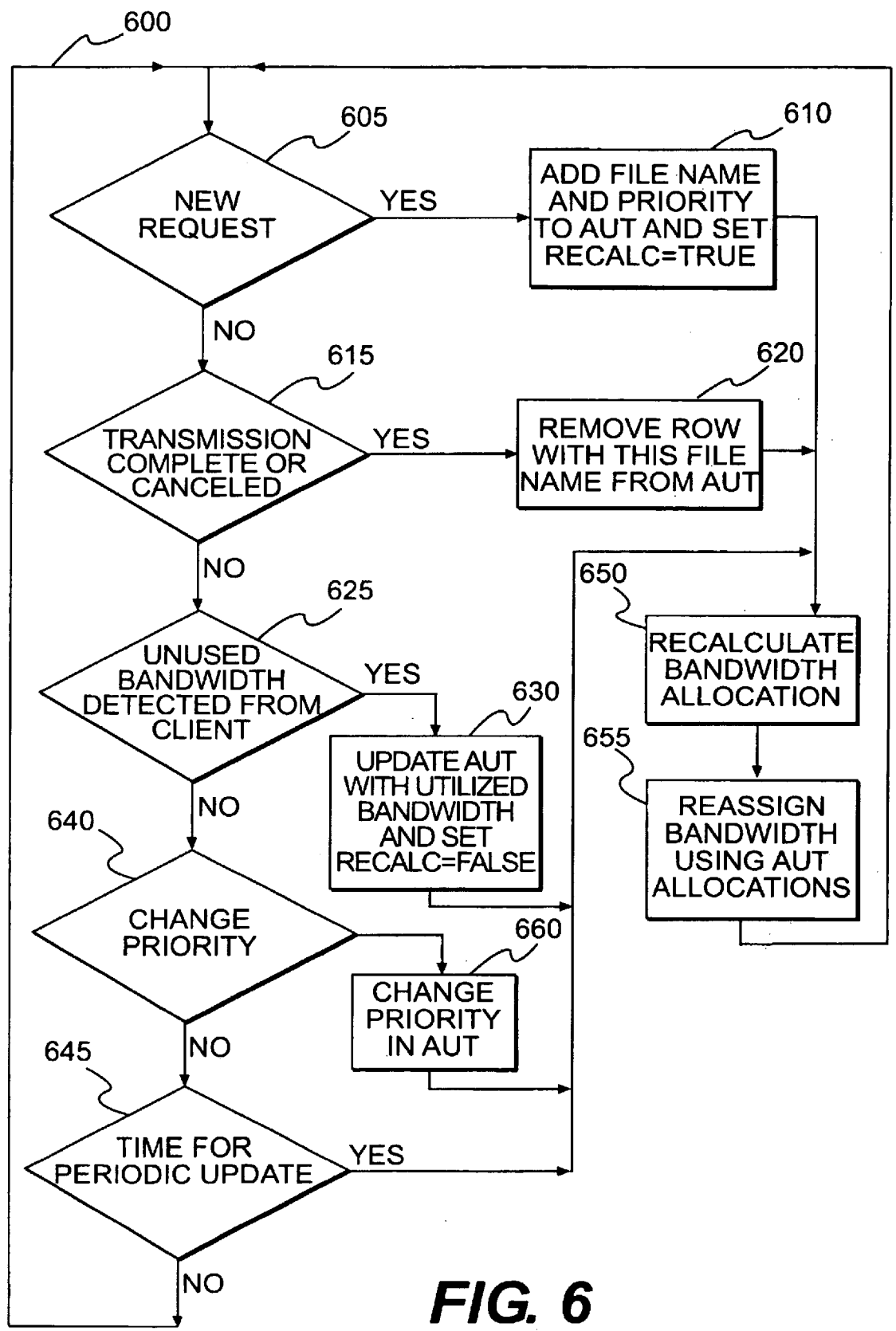
FIG. 6 is a flowchart of a process to initiate dynamic bandwidth allocation by the server.

FIG. 6 is a flowchart of a monitoring procedure to initiate dynamic bandwidth allocation by the server. A continuous monitoring loop 600 responds to events affecting bandwidth allocation. One event is a new request (605) for bandwidth. Normally, this will occur when an HTTP GET command is received by the server. Following a new request 605 the requested file name and its associated priority based on its file-type are placed into the AUT and the recalculation variable is set to TRUE (610). Then the recalculation of bandwidth allocation algorithm is invoked (650) which updates the AUT, then the AUT is used to provide parameters to the bandwidth allocator (655) and the monitoring loop resumes 600.

An event indicating the completion or cancellation of a transmission connection (615) will remove the connection from the AUT (620). Then the recalculation of bandwidth allocation algorithm is invoked (650) which updates the AUT, the AUT is then used to provide parameters to the bandwidth allocator (655) and the monitoring loop resumes (600).

An event indicating that the client is not utilizing all of the allocated bandwidth occurs when the average throughput of data (calculated, for example, using the number of ACKs received per unit of time) falls below the allocated bandwidth maximum data rate (625). Various protocols from in the prior art, including Stop-And-Wait Link Utilization and Sliding-Window Flow Control, can be used to calculate the actual data rate. For example, one might add the packet lengths of a number of packets sent over a period of time and divide the total by the length of the period of time to determine effective throughput, or actual data rate. That value is then stored in the AUT and the recalculation variable is set to FALSE so that for the remainder of that retrieval request the bandwidth re-allocation algorithm will not increase that connection's bandwidth (630). Then the recalculation of bandwidth allocation algorithm is invoked (650) which updates the AUT, the AUT is then used to provide parameters to the bandwidth allocator (655) and the monitoring loop resumes (600).

An event indicating a change in the relative priority of a transmission (640) may occur. The priority for that transmission is then updated in the AUT (660). Then the recalculation of bandwidth allocation algorithm is invoked (650) which updates the AUT, the AUT is then used to provide parameters to the bandwidth allocator (655) and the monitoring loop resumes (600).

A scheduled event may be set to occur periodically (645). This event is to handle any situation not handled by the other events. Then the recalculation of bandwidth allocation algorithm is invoked (650) which updates the AUT, the AUT is used to provide parameters to the bandwidth allocator (655) and the monitoring loop resumes (600).

Figure 7A:
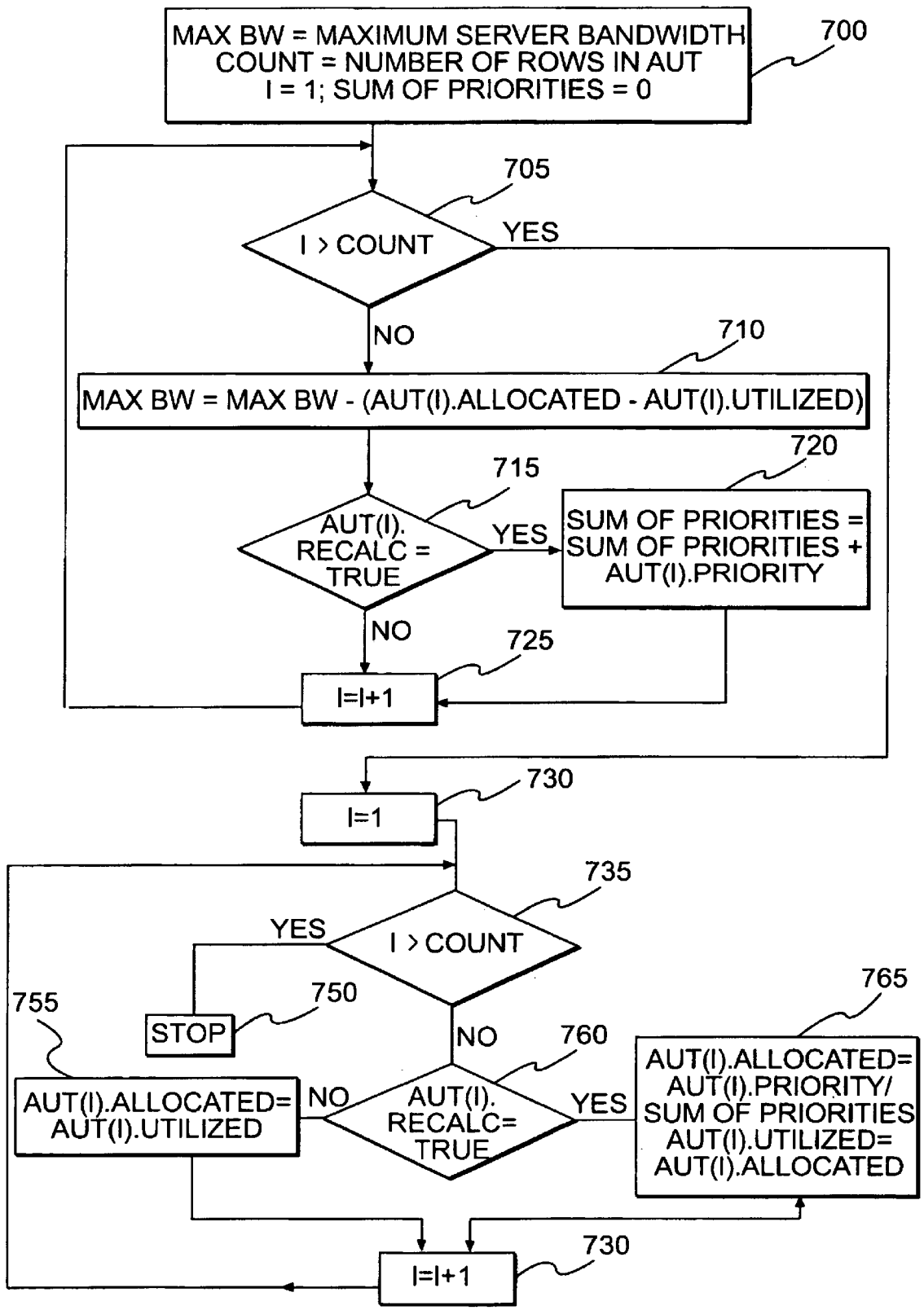
FIG. 7A is a flowchart of a process for dynamic bandwidth allocation by the server.

FIG. 7A is a flowchart of a procedure for dynamic bandwidth allocation by the server. The procedure begins by initializing several variables: MaxBW is set to the maximum bandwidth available to the server, COUNT is set to the number of rows in the AUT (i.e., the number of current connections), SumOfPriorities is set to zero, and index I (a loop counter) is set to one (700). If index I is not greater than COUNT (705) then there are more rows to process in the AUT. At 710 the MaxBW is decreased by any difference between the allocated bandwidth and the utilized bandwidth. If the AUT recalculation variable for the current row is TRUE then the priority of the current row is added to the SumOfPriorities (720). This action prevents those connections that are being under-utilized from receiving more bandwidth which they have already demonstrated they cannot use. Then index I is incremented by one (725) and the loop continues at 705 until all the rows in the AUT have been processed.

Index I is re-initialized at 730 to one and another loop commences at 735. While index I does not exceed COUNT (735), the recalculation variable of each row is checked 760. If it is FALSE then the current AUT row has its allocated bandwidth set to equal its utilized bandwidth (755) thus reflecting the true state of the system. If it is TRUE, then the current AUT row allocated bandwidth variable is assigned the value of the ratio of the current row's priority to the SumOfPriorities and the utilized value is set to equal the allocated value (765). This assumes that the client connection can utilize the new bandwidth it has been allocated. If it cannot, then it will be detected and corrected via FIG. 6 at 625. In either case, index I is incremented (770) and processing the remaining rows in the AUT continues at 735. If all the rows have been processed (735) then the AUT has been completely updated and is ready for use by the bandwidth allocator in FIG. 6 at 655 and the process is terminated (750).

Figure 7B:
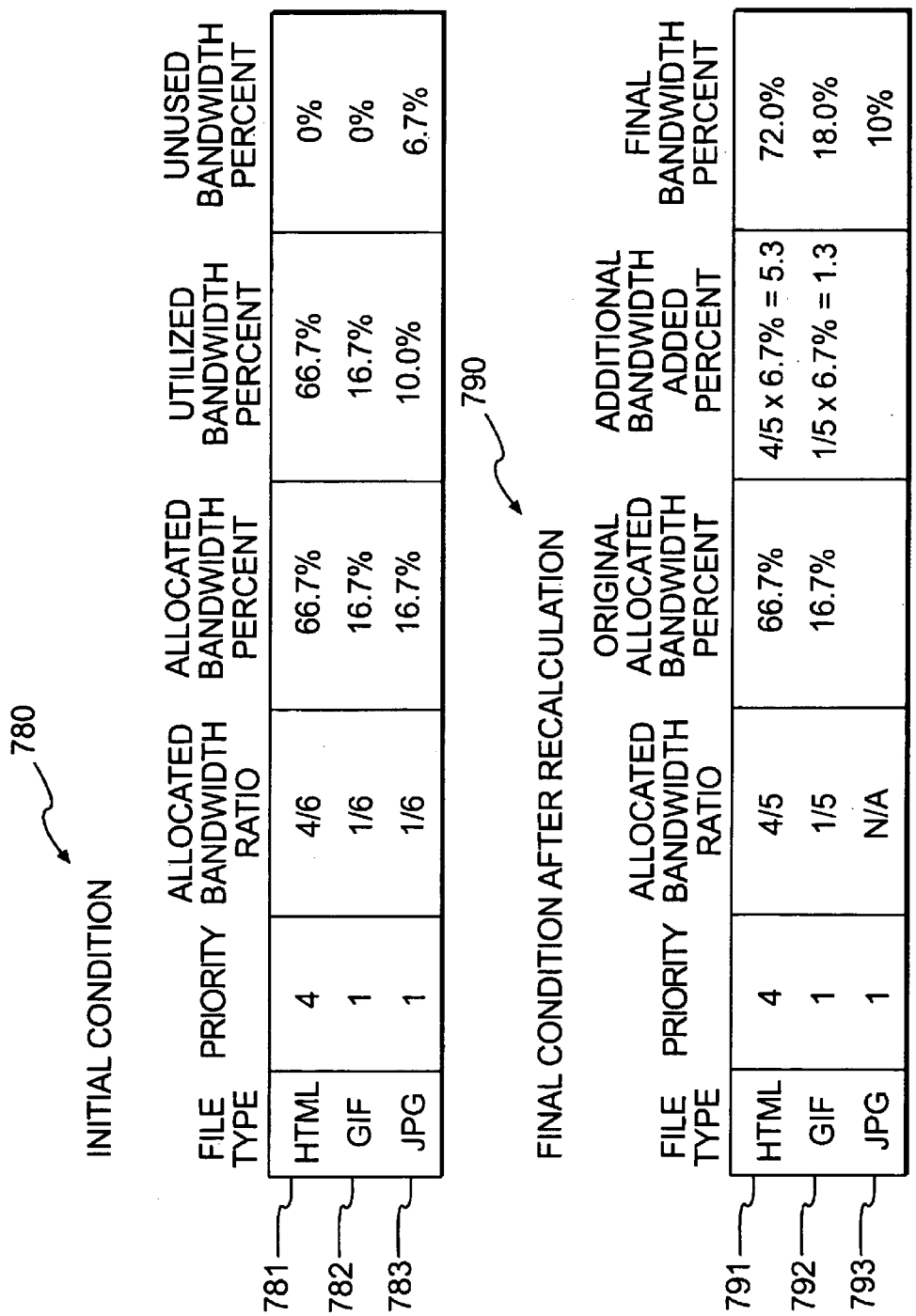
FIG. 7B is a illustration depicting the result of one iteration of the dynamic bandwidth allocation procedure of FIG. 7A.

FIG. 7B is a illustration depicting the result of one iteration of the dynamic bandwidth allocation procedure of FIG. 7A. Assume a web server is transmitting an HTLM document and a JPG file to one client and a GIF file to another client. Using the bandwidth allocation algorithm described in FIG. 7A and using the priority scheme of FIG. 4, the sum of the priorities is 6 so the HTLM document will receive ⅘ (66.7%) of the bandwidth, and both the JPG file and GIF file will receive ⅙ (16.7%) of the bandwidth. Now assume that the second client can only utilize 10% of the total bandwidth (which was determined using the process in FIG. 6 at 625). The initial state 780 is shown in rows 781, 782 and 783. Note that 783 has unused bandwidth capacity of 6.7% of the server's total bandwidth. In order for this bandwidth to be used, the bandwidth re-allocation algorithm of FIG. 7A is run again.

The results of the reallocation are shown in the final state 790. Since the recalculation variable of the AUT row for the JPG file would have been set to FALSE, the sum of the priorities is now 5 and the proportional distribution of the spare bandwidth would be ⅘ for the HTML document 791 and ⅕ for the GIF document 792. So, ⅘ of the 6.7% available bandwidth is re-allocated to the HTML document, resulting in a final bandwidth utilization of 72.0%. Repeating the process for the GIF documents lead to a final bandwidth utilization of 18.0%. The JPG file retains the 10.0% share it could use prior to the re-allocation.

Figures 8A, 8B:
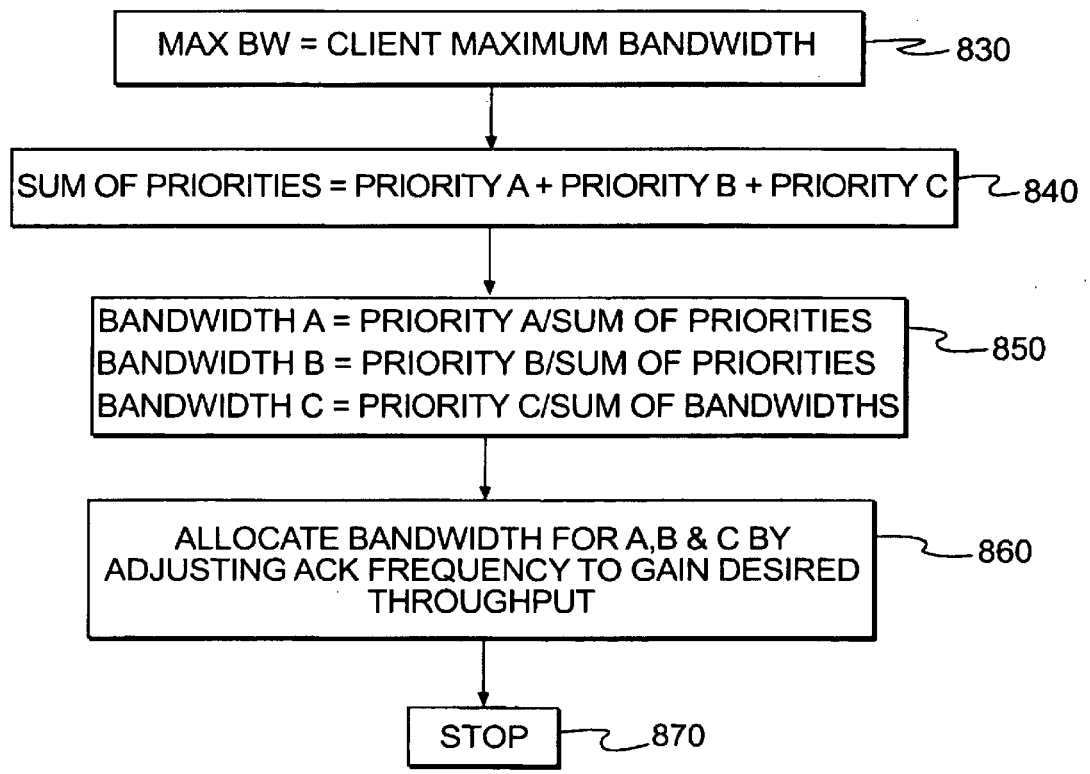
FIG. 8A is a database schema organized as an exemplary way for storing client browser-status priorities.
FIG. 8B is a flowchart of a process for clientside control of bandwidth allocation.

FIG. 8A is a database schema organized as an exemplary way for storing client browser-status priorities. Each browser has an ID 800, a Status 810 and a Priority 815. The row 820 has an ID of A, a status of "Has Focus" (i.e., is the user's active browser) and a high priority of 4. Browser ID B 821 does not have the focus but is visible on the screen and has a priority of 2. Browser ID C 823 does not have the focus and is not visible (perhaps minimized) and has a low priority of 1.

FIG. 8B is a flowchart of a procedure for clientside control of bandwidth allocation. Similar to the algorithm of FIG. 7A, this procedure utilizes the ratio of a process priority to that of the sum of the priorities of all active process. The MaxBW constant is initialized at 830 with the maximum bandwidth the client has available to manage. The priorities of the browsers in use are summed (840) and that sum is then used as the divisor of the individual browser priorities to determine the bandwidth to be allocated to each browser (850). Next, the bandwidth is allocated, e.g. by controlling the number of packets acknowledged to the server to obtain the desired throughput rate (860) (as described in FIG. 6 at 625) and the process terminates (870).

Figure 9:
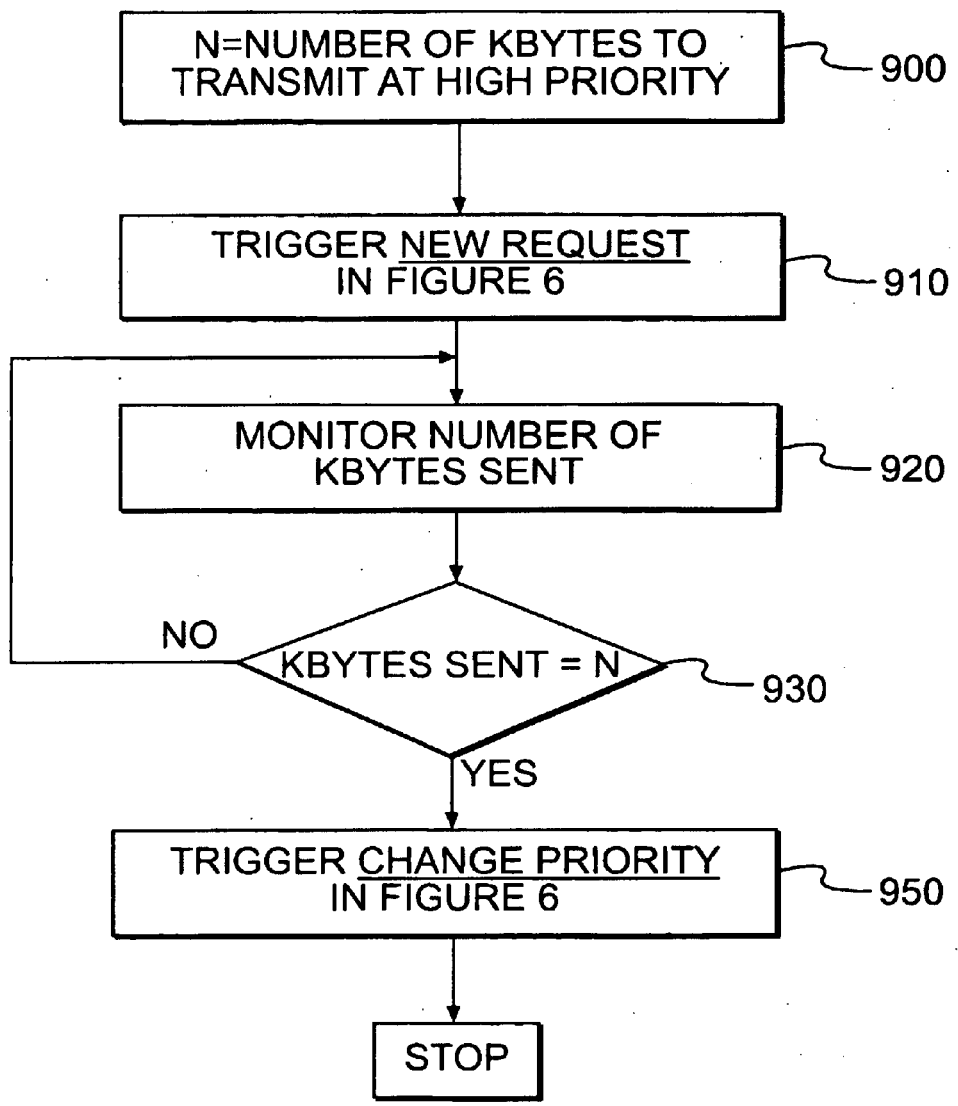
FIG. 9 is a flowchart of a process for changing the priority of a connection after a fixed amount of data has been transmitted.

FIG. 9 is a flowchart of a procedure for changing the priority of a connection after a fixed amount of data has been transmitted. As an alternative or a supplement to the preferred embodiment, an HTML file could be assigned a high priority only during the transmission of the first N KB. This approach might be used when only the first screen or part of the first screen of text must be delivered as rapidly as possible. The process begins by initializing N to the number of KB to transmit at high priority (900). Then the New Request event (910) (FIG. 6 at 605) is triggered. The number of KB transmitted is monitored (920) and when the number transmitted equals N (930) the AUT is updated to reflect a lower priority by triggering the Change Priority event (950) (FIG. 6 at 640).

FIG. 10A is a database schema organized as an exemplary way for storing a value representing the variable amount of data a specific file needs have transmitted at high priority. As another alternative or supplement to the preferred embodiment, an HTML file could be examined (e.g., using a browser) to determine the number of bytes necessary to render the first page. This number of bytes would then be stored (1005) in a database along with the HTML file name 1000. The database rows 1006, 1007 and 1008 are examples of the name and byte tuples required.

FIG. 10B is a flowchart of a procedure for changing the priority of a connection after the variable amount of data indicated in FIG. 10A has been transmitted. The variable N is set, via a database lookup of the file name, to the number of bytes that need to be transmitted with high priority 1010. The New Request event is triggered (1020) (FIG. 6 at 605) and the number of bytes transmitted is monitored (1030). When the number of bytes transmitted equals N (1040) the Change Priority event is triggered (1060) (FIG. 6 at 640) which then updates the AUT table and begins the bandwidth re-allocation process and this process is terminated (1070).

Figures 11A, 11B:
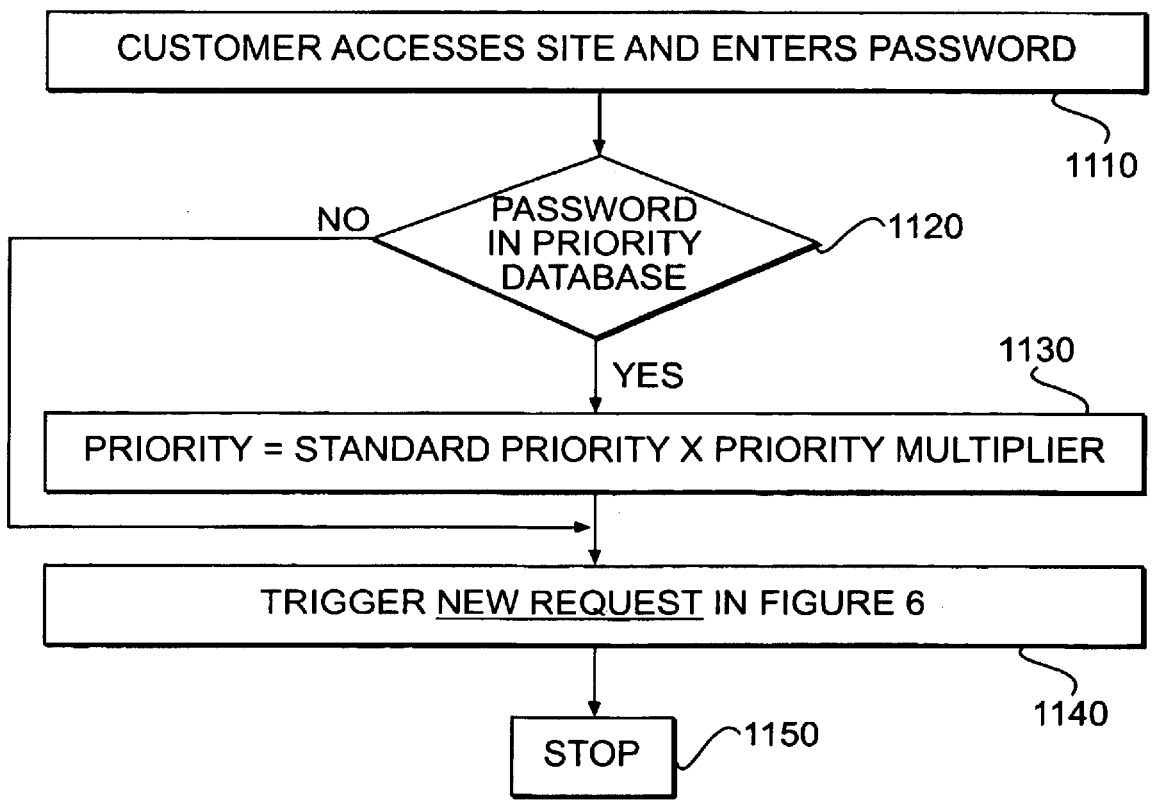
FIG. 11A is a database schema organized as an exemplary way for storing a list of customer passwords and the corresponding priority multiplier.
FIG. 11B is a flowchart of a process for increasing the priority of a connection using the information contained within FIG. 11A.

FIG. 11A is a database schema organized as an arc 15 exemplary way for storing a list of customer passwords and a corresponding priority multiplier. As another supplement or alternative to the preferred embodiment, the priority given to web pages could be based on information about the person requesting them. For example, valued customers can be given higher priority. When implemented in a log-in type website, a list of passwords that have higher than normal priority could be kept in the form of the tuple Customer Password 1100 and Priority Multiplier 1105. As rows 1106, 1107 and 1108 show, the multiplier can be different based on how valued the customer is. In another approach, a list of network addresses of valued customers is maintained and checked against the address of client's connections to the server to determine priorities.

FIG. 11B is a flowchart of a procedure for increasing the priority of a connection using the information contained within FIG. 11A. A customer accesses a website and enters his password (1110). If the password is in the priority database of FIG. 11A (1120) then the priority for the document requested is set to the standard priority for that type of document multiplied by the priority multiplier 1130. For example, if an HTLM document has a priority of 4 and the multiplier is 2 the new priority would be 8. Then the New Request event is triggered (1140) (FIG. 6 at 605) and this process is terminated (1140).

Figures 12A, 12B:
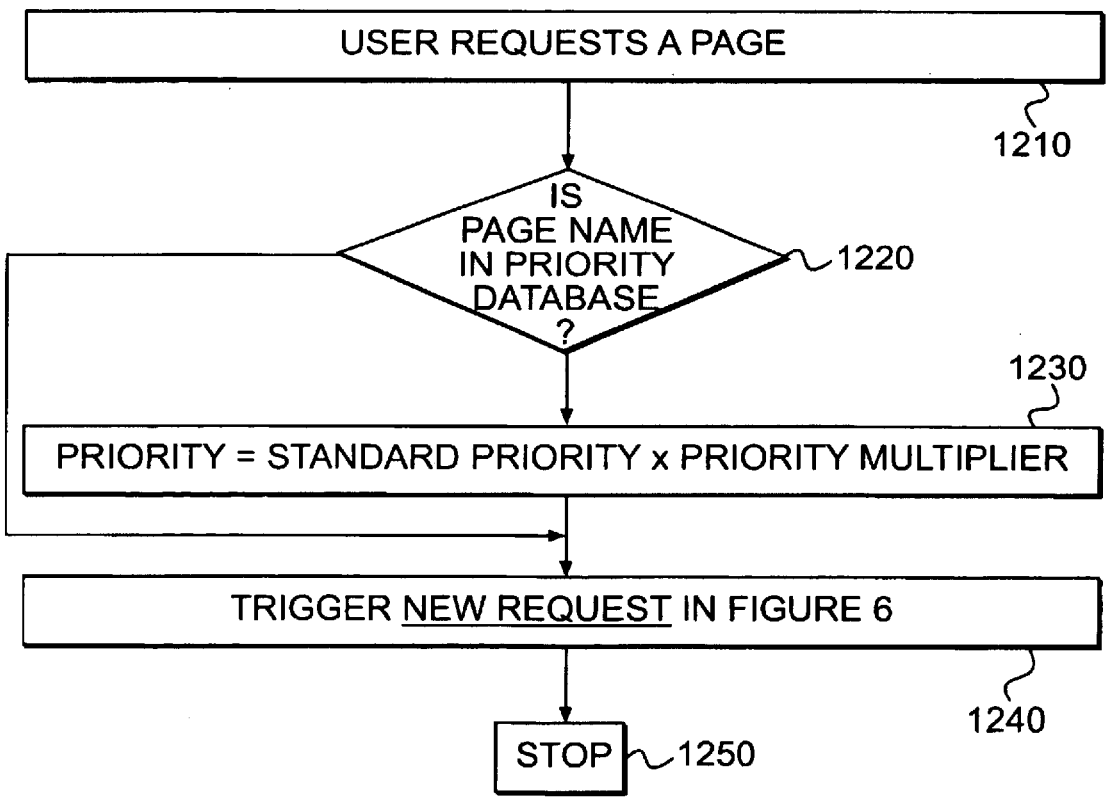
FIG. 12A is a database schema organized as an exemplary way for storing a list of documents and their associated priority multipliers.
FIG. 12B is a flowchart of a process for increasing the priority of a connection using the information contained within FIG. 12A.

FIG. 12A is a database schema organized as an exemplary way for storing a list of documents and their associated priority multipliers. As another supplement or alternative to the preferred embodiment, the priority given to web pages could be based on content of the pages themselves and their value to the web page owner. Providing an order form on the user's screen may be deemed to have a higher priority than delivering product information. The tuples of HTLM page name 1200 and Priority Multiplier 1205 can be stored in the database. As rows 1206, 1207 and 1208 show, the multiplier can be different based on how important a particular HTML document is.

FIG. 12B is a flowchart of a procedure for increasing the priority of a connection using the information contained within FIG. 12A. The user requests an HTML page (1210). If the page name is found in the priority database (1220) then the transmission priority becomes the normal transmission priority multiplied by the priority multiplier (1230). Then the New Request event is triggered (1240) (FIG. 6 at 605) and this process is terminated (1250).

There has thus been described a communication system in which communication resource allocated by either servers or clients can be adapted based on priority of various types. As a result, user satisfaction with the network is enhanced by obtaining desired information in a prompt fashion and server and client resources are prioritized to enhance throughput of the network.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Computer apparatus for allocating communications bandwidth, comprising:
    a. a computer having a communications interface for sending information over a communications link; and
    b. a program on said computer, to permit said computer to act as a server, said program when running, enabling said computer to reallocate bandwidth assigned to users connected to said server over said communications interface;
    the computer reallocating bandwidth in response to a request for data from one of the users over the communications interface wherein the reallocating is based on a file attribute associated with data requested in the request for data wherein the file attribute comprises one of a text data attribute, a style data attribute and, a graphic attribute, wherein if the file attribute comprises the text data attribute, the data requested is given a highest priority index, if the file attribute comprises the style data attribute, the data requested is given a next highest priority index, and if the file attribute comprises the graphic data attribute, the data requested is given a lowest priority index, and wherein the reallocating is based on the priority index.

2. Apparatus of claim 1 in which bandwidth is allocated to users based on the number of users and on the types of data each is requesting from the server.

3. Apparatus of claim 2 in which said program, when running, detects when a user is unable to receive information at a rate allocated to that user.

4. Apparatus of claim 3 in which, when a user is unable to receive information at a rate allocated to that user, the user is excluded from a reallocation of available bandwidth.

5. Apparatus of claim 2 in which bandwidth is reallocated dynamically.

6. Apparatus of claim 1 in which the reallocation occurs in response to reception of a GET request over the communication interface.

7. A method for allocating communications bandwidth across a communications interface of a computer, comprising the steps of:
   a. providing information to a plurality of users connected to said computer across said communications interface;
   b. receiving a request for data from one of the plurality of users over the communications interface; and
   c. reallocating bandwidth assigned to the plurality of users based on a file attribute associated with data requested in the request for data wherein the file attribute comprises one of a text data attribute, a style data attribute and, a graphic attribute, wherein if the file attribute comprises the text data attribute, the data requested is given a highest priority index, if the file attribute comprises the style data attribute, the data requested is given a next highest priority index, and if the file attribute comprises the graphic data attribute, the data requested is given a lowest priority index, and wherein the reallocating is based on the priority index.

8. The method of claim 7 in which bandwidth is allocated to users based on the number of users and on the types of data each is requesting.

9. The method of claim 8 in which reallocation of bandwidth occurs in response to occurrence of an event.

10. The method of claim 8 in which, when a process is unable to receive information at a rate allocated to that process, the process is excluded from a reallocation of available bandwidth.

11. The method of claim 7 in which bandwidth is reallocated dynamically.

* * * * *